United States Patent
Guzelgunler

(10) Patent No.: US 9,923,505 B2
(45) Date of Patent: Mar. 20, 2018

(54) METHODS AND SYSTEMS FOR CONTROLLING AN ELECTRIC MOTOR

(71) Applicant: Regal Beloit America, Inc., Beloit, WI (US)

(72) Inventor: Yilcan Guzelgunler, Troy, OH (US)

(73) Assignee: Regal Beloit America, Inc., Beloit, WI (US)

( * ) Notice: Subject to any disclaimer, the term of this patent is extended or adjusted under 35 U.S.C. 154(b) by 166 days.

(21) Appl. No.: 14/090,365

(22) Filed: Nov. 26, 2013

(65) Prior Publication Data
US 2015/0145459 A1    May 28, 2015

(51) Int. Cl.
| | |
|---|---|
| H02M 7/49 | (2007.01) |
| H02P 23/20 | (2016.01) |
| H02P 21/20 | (2016.01) |
| H02P 27/04 | (2016.01) |
| H02P 21/00 | (2016.01) |
| H02M 1/38 | (2007.01) |

(52) U.S. Cl.
CPC .............. *H02P 27/04* (2013.01); *H02P 21/50* (2016.02); *H02M 2001/385* (2013.01)

(58) Field of Classification Search
CPC ....... H02P 2209/07; H02P 6/008; H02P 6/002
See application file for complete search history.

(56) References Cited

U.S. PATENT DOCUMENTS

| | | | | |
|---|---|---|---|---|
| 6,477,067 | B1* | 11/2002 | Kerkman et al. | 363/41 |
| 7,173,393 | B2* | 2/2007 | Maeda | H02M 7/53873 318/400.02 |
| 7,528,569 | B2 | 5/2009 | Hidaka et al. | |
| 7,541,769 | B2* | 6/2009 | Nawa | H02M 7/53875 318/632 |
| 2008/0180054 | A1* | 7/2008 | Kinpara | H02P 21/16 318/720 |
| 2013/0063059 | A1 | 3/2013 | Chi et al. | |
| 2013/0154531 | A1* | 6/2013 | Furutani et al. | 318/400.26 |
| 2013/0278200 | A1* | 10/2013 | Fujii | H02P 6/002 318/722 |
| 2013/0300334 | A1* | 11/2013 | Tooyama | H02M 1/12 318/504 |
| 2014/0354205 | A1* | 12/2014 | Tomizaki et al. | 318/490 |

FOREIGN PATENT DOCUMENTS

WO   20100010987 A1   1/2010

* cited by examiner

*Primary Examiner* — Eduardo Colon Santana
*Assistant Examiner* — Charles S Laughlin
(74) *Attorney, Agent, or Firm* — Armstrong Teasdale LLP

(57) ABSTRACT

A system and method of controlling an electric motor using a motor drive controller are provided. The motor drive controller includes a rectifier configured to convert an AC input voltage to a DC voltage, a DC bus electrically coupled to the rectifier, an inverter electrically coupled to the DC bus and configured to generate an AC voltage to drive the electric motor, and a control unit. The control unit includes a sign calculation module configured to determine a polarity of each phase of a reference current command and a compensation module configured to generate a voltage compensation command signal using one of the determined polarities of the reference current command and a measured current, and one of a measurement of DC bus voltage and a constant DC bus voltage value, the voltage compensation signal compensating the drive controller to neutralize a deadtime effect.

17 Claims, 8 Drawing Sheets

| $\overline{\Delta V_t}$ | Compensation Vector with Voltage and Current Algorithms $\overline{\Delta V_t}$ | $i_A\ i_B\ i_C$ |
|---|---|---|
| $\overline{\Delta V_1}$ | $2\Delta + 2\Delta^i$ | $+\ -\ -$ |
| $\overline{\Delta V_2}$ | $(\Delta + \Delta^i) + j\sqrt{3}(\Delta + \Delta^i)$ | $+\ +\ -$ |
| $\overline{\Delta V_3}$ | $-(\Delta + \Delta^i) + j\sqrt{3}(\Delta + \Delta^i)$ | $-\ +\ -$ |
| $\overline{\Delta V_4}$ | $-2(\Delta + \Delta^i)$ | $-\ +\ +$ |
| $\overline{\Delta V_5}$ | $-(\Delta + \Delta^i) - j\sqrt{3}(\Delta + \Delta^i)$ | $-\ -\ +$ |
| $\overline{\Delta V_6}$ | $(\Delta + \Delta^i) - j\sqrt{3}(\Delta + \Delta^i)$ | $+\ -\ +$ |

FIG. 7

METHODS AND SYSTEMS FOR CONTROLLING AN ELECTRIC MOTOR

BACKGROUND OF THE DISCLOSURE

The field of the invention relates generally to electric motors, and more specifically, to methods and systems for controlling electric motors.

Electric motor drive controllers typically include an inverter for driving an electric motor. The inverter converts a direct current (DC) bus voltage to an alternating current (AC) voltage by switching upper and lower switching devices that are coupled in series using pulse width modulation (PWM). If the upper and lower switching devices are turned on at the same time, short-circuiting between the upper and lower switching devices may occur, resulting in damage to the switching devices. To prevent such short-circuiting, a deadtime is provided where both the upper and lower switching devices are off. The presence of deadtime, however, may cause distortion of current supplied to the electric motor and pulsation of torque. Moreover, deadtime introduces error in voltage estimation in low voltage and low speed regions of electric motor operation. These issues are commonly referred to by the term "deadtime effect".

BRIEF DESCRIPTION OF THE DISCLOSURE

In one aspect, an electric motor drive controller is configured to be coupled to an electric motor. The motor drive controller includes a rectifier configured to convert an AC input voltage to a DC voltage, a DC bus electrically coupled to the rectifier, an inverter electrically coupled to the DC bus and configured to generate an AC voltage to drive the electric motor, and a control unit. The control unit includes a sign calculation module configured to determine a polarity of each phase of a reference current command and a compensation module configured to generate a voltage compensation command signal using one of the determined polarities of the reference current command and a measured current, and one of a measurement of DC bus voltage and a constant DC bus voltage value, the voltage compensation signal compensating the drive controller to neutralize a deadtime effect.

In another aspect, a method is provided of controlling an electric motor using a motor controller. The method includes determining a polarity of each phase of a reference current command and generating a voltage compensation command signal using the one of determined polarities of the reference current command and measured currents of the electric motor, and one of a measurement of DC bus voltage and a constant DC bus voltage, the voltage compensation signal compensating the drive controller to neutralize a deadtime effect.

BRIEF DESCRIPTION OF THE DRAWINGS

FIG. 7 is an exemplary voltage and current compensation calculation table used by the current compensation module shown in FIG. 6.

DETAILED DESCRIPTION OF THE DISCLOSURE

Figure 1:
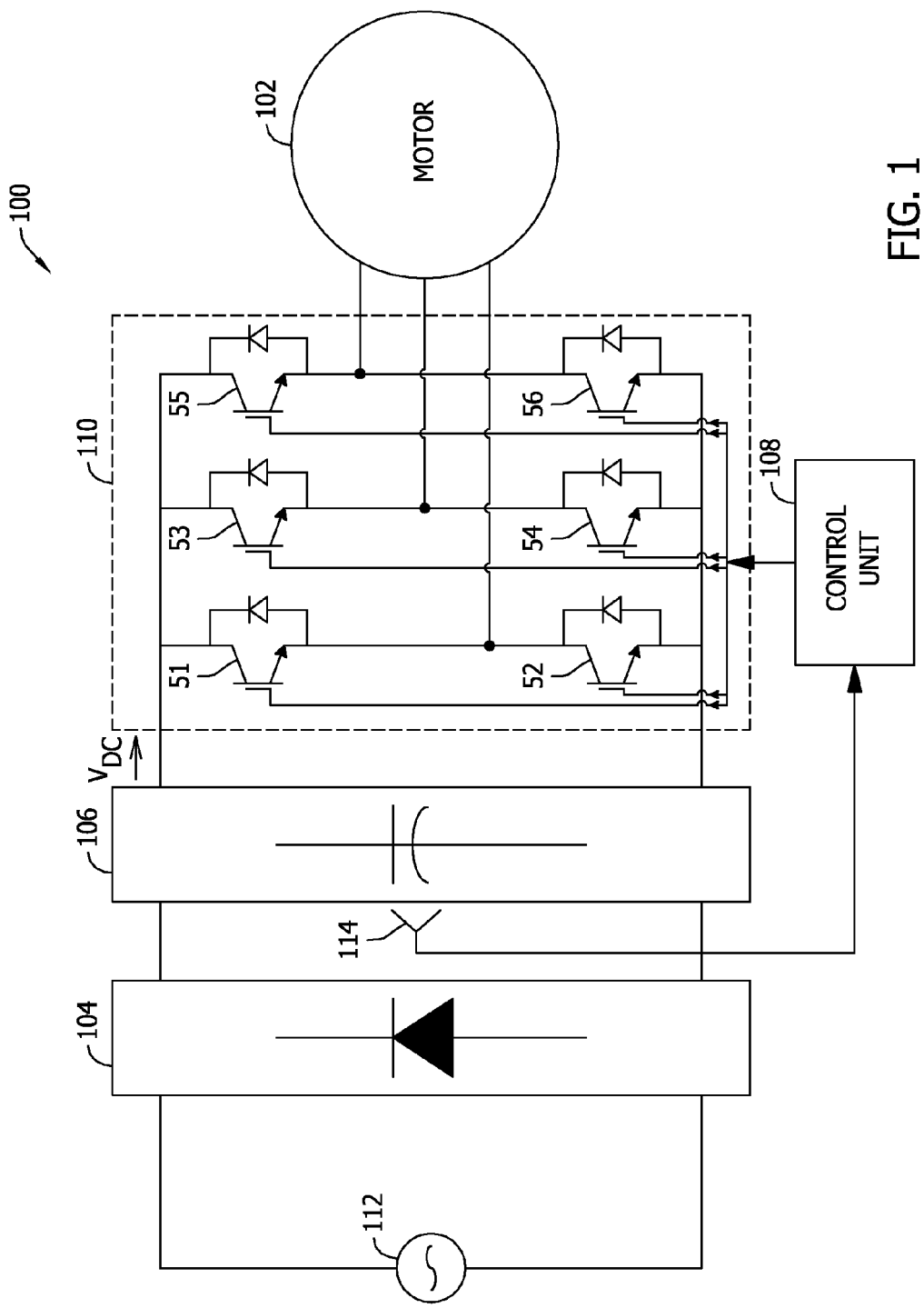
FIG. 1 is a functional diagram of a motor controller that may be used for operating an electric motor.

FIG. 1 is a functional diagram of a motor drive controller 100 that may be used for operating an electric motor 102. In the exemplary embodiment, motor drive controller 100 includes a rectifier 104, a bus capacitor 106, a control unit 108, and an inverter 110. Motor drive controller 100 is coupled to a power supply 112 for receiving input power to drive electric motor 102.

In the exemplary embodiment, power supply 112 supplies a single-phase alternating current (AC) input voltage or a three-phase AC input voltage to motor drive controller 100. Rectifier 104 and bus capacitor 106 convert AC input voltage from a power supply 112 to a DC voltage and provide it to inverter 108. Inverter 110 conditions the DC voltage and applies it to drive electric motor 102. In the exemplary embodiment, inverter 110 converts the DC voltage to a three-phase AC voltage. Alternatively, inverter 110 converts the DC voltage to any type of voltage that enables motor drive controller 100 to function as described herein.

In the exemplary embodiment, control unit 108 is communicatively coupled to inverter 110. Control unit 108 may be implemented as hardware, software, and/or a combination of hardware and software. Additionally, control unit 108 in one or more processing devices, such as a microcontroller, a microprocessor, a programmable gate array, a reduced instruction set circuit (RISC), an application specific integrated circuit (ASIC), a digital signal processor (DSP), a pulse-width modulation (PWM) controller, and/or any other hardware capable of converting reference values to PWM signals. Control unit 108 generates and outputs switching control signals to drive inverter 110 to convert DC bus voltage $V_{DC}$ into a single-phase or a three-phase modulated voltage Va, $V_b$, and $V_c$. As described in more detail herein, control unit 108 implements a deadtime voltage compensation algorithm to reduce effects produced by the presence of deadtime in motor drive controller 100.

In the exemplary embodiment, inverter 110 includes six switch elements S1, S2, S3, S4, S5, and S6. Switch elements S1-S6 are configured to turn on and off in response to the state (an enabling state with a high voltage level or a disabling state with a low voltage level) of the switching control signals generated by control unit 108. The control terminals of switch elements S1-S6 are coupled to control unit 108, and switch elements S1-S6 are serially interconnected in pairs to constitute three switch pairs. For example, switch elements S1 and S2 constitute an A-phase leg, switch elements S3 and S4 constitute a B-phase leg, and switch elements S5 and S6 constitute a C-phase leg. The switch pairs are coupled in parallel with each other at the DC side of rectifier 104 and across bus capacitor 106. In operation, the switch pairs are turned on and off in response to switching control signals generated by control unit 108, thereby selectively transmitting the energy of the DC bus voltage $V_{DC}$ to motor 102 through the switch pairs. Inverter 110 also includes six diodes. Each diode is coupled in parallel across a respective switch element S1-S6 for protecting switch elements S1-S6 when they are turned off. Switching control signals for each phase leg are provided with a deadtime to prevent damage to motor drive controller 100. Switch elements S1-S6 may be implemented by thyristor switch elements, such as bipolar junction transistors (BJTs), metal-oxide-semiconductor field-effect transistors (MOSFETs), insulated gate bipolar transistors (IGBTs), silicon-controlled rectifiers (SCRs), triode AC switches (TRIACs), silicon-carbide (SiC), or gallium nitride (GaN).

Motor drive controller 100 also includes a voltage sensor 114 coupled across capacitor 106. Voltage sensor 116 is configured to measure a DC link voltage being output by rectifier 104. In some embodiments, voltage sensor 114 transmits the DC link voltage measurement to control unit 108 for use in controlling electric motor 102

Figure 2:
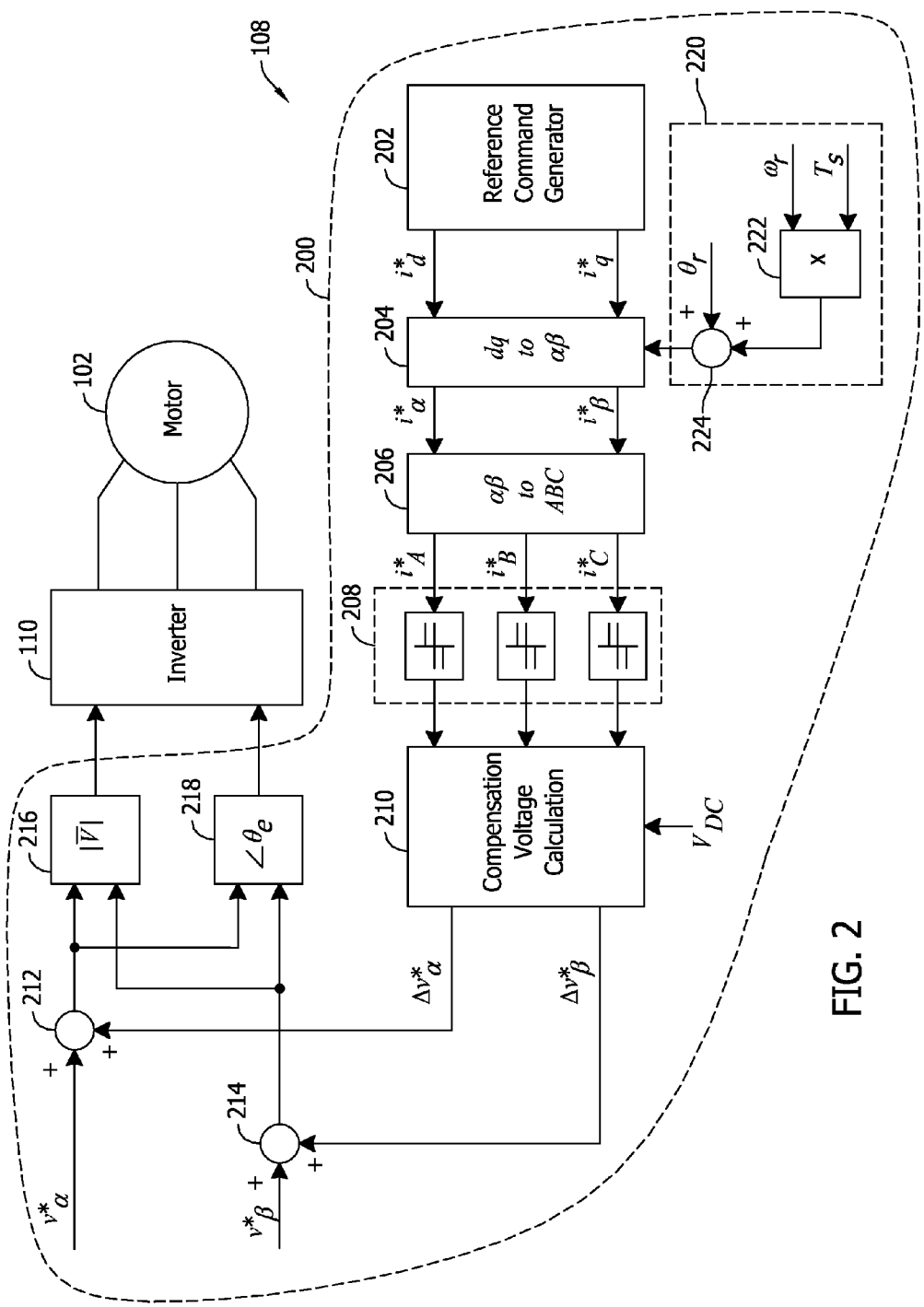
FIG. 2 is a block diagram of an exemplary control unit that may be used with the motor controller shown in FIG. 1.

FIG. 2 is a block diagram of an exemplary control unit 108 (shown in FIG. 1) that implements a deadtime voltage compensation algorithm 200. In the exemplary embodiment, control unit 108 implements deadtime compensation algorithm 200 to add an opposing compensation voltage vector $\overline{\Delta V}$ to neutralize the effect of a deadtime voltage vector. Deadtime voltage vector is calculated as a vector amount by which the output voltage of inverter 110 is modified from the commanded value due to deadtime effect. Whether the deadtime voltage is decreasing or increasing, the inverter output voltage magnitude depends on a polarity of each phase of the current being output by inverter 110.

In the exemplary embodiment, control unit 108 includes a reference command generator 202, a α-β conversion module 204, an A-B-C conversion module 206, a sign calculation module 208, a compensation module 210, a first summation block 212, a second summation block 214, a magnitude calculation module 216, and an angle calculation module 218.

Reference command generator 202 generates a d-axis current command $i_d^*$ and a q-axis current command $i_q^*$. Reference command generator 202 uses reference currents rather than measured motor phase currents to avoid noise and provide a stable current waveform. Current commands $i_d^*$ and $i_q^*$ are input into α-β conversion module 204 for conversion into a stationary α-β reference frame. α-β conversion module 204 converts current commands $i_d^*$ and $i_q^*$ into current commands $i_\alpha^*$ and $i_\beta^*$. Current commands $i_\alpha^*$ and $i_\beta^*$ are converted into a three-phase coordinate system by A-B-C conversion module 206, which inputs three-phase reference current values $i_A^*$, $i_B^*$, and $i_C^*$ into sign calculation module 208.

Figure 3:
FIG. 3 is an exemplary lookup table used by the compensation module shown in FIG. 2.

Sign calculation module 208 determines polarity for each phase current $i_A^*$, $i_B^*$, and $i_C^*$ and inputs the polarities into compensation module 210. A DC bus voltage $V_{DC}$ measurement is also input into compensation module 210. Compensation module 210 uses a lookup table to determine a voltage compensation signal for neutralizing the effect of deadtime voltage vector. More specifically, compensation module 210 generates voltage vector components $\Delta v_\alpha^*$ and $\Delta v_\beta^*$. An example lookup table 300 used by compensation module 210 is shown in FIG. 3. In lookup table 300, $\overline{\Delta V}$ represents the deadtime compensation voltage vector, $\overline{\Delta V_1}$-$\overline{\Delta V_6}$ represent deadtime compensation voltage vectors of inverter 110 for each set of polarity of A, B, and C phase currents ($i_A, i_B, i_C$), Δ represents $$\frac{t_{DT}}{T_s}\sqrt{\frac{2}{3}}\,V_{DC},$$

$V_{DC}$ is DC bus voltage, $t_{DT}$ is deadtime duration, $T_s$ is PWM switching period and $i_A, i_B, i_C$ represent the current polarities determined by sign calculation module 208. Using polarities $i_A^*$, $i_B^*$, $i_C^*$ of the reference current command and the measurement of DC bus voltage $V_{DC}$, compensation module 210 generates compensation voltage vector components $\Delta v_\alpha^*$ and $\Delta v_\beta^*$.

Voltage vector component $\Delta v_\alpha^*$ is added to commanded voltage $v_\alpha^*$ at first summation block 212 and $\Delta v_\beta^*$ is added to commanded voltage $v_\beta^*$ at second summation block 214. The resultant $v_\alpha$ and $v_\beta$ are input into magnitude calculation module 216 and angle calculation module 218 for determining a magnitude and an angle of a final voltage command V* to be applied to inverter 110.

In the exemplary embodiment, control unit 108 also includes a phase advancing module 220 that optimizes a time that the compensation voltage is applied by adding a position difference to the rotor angle. More specifically, electrical rotor speed $\omega_r$ is multiplied by a sample time $T_s$ at multiplication block 222 to calculate an angle to be added to an estimated rotor angle $\theta_r$ at summation block 224. Sample time $T_s$ may also be multiplied by an integer or fractional factor. An effect of phase advancing may be observed from a total harmonic distortion (THD) of the current and the current waveform.

Figure 4:
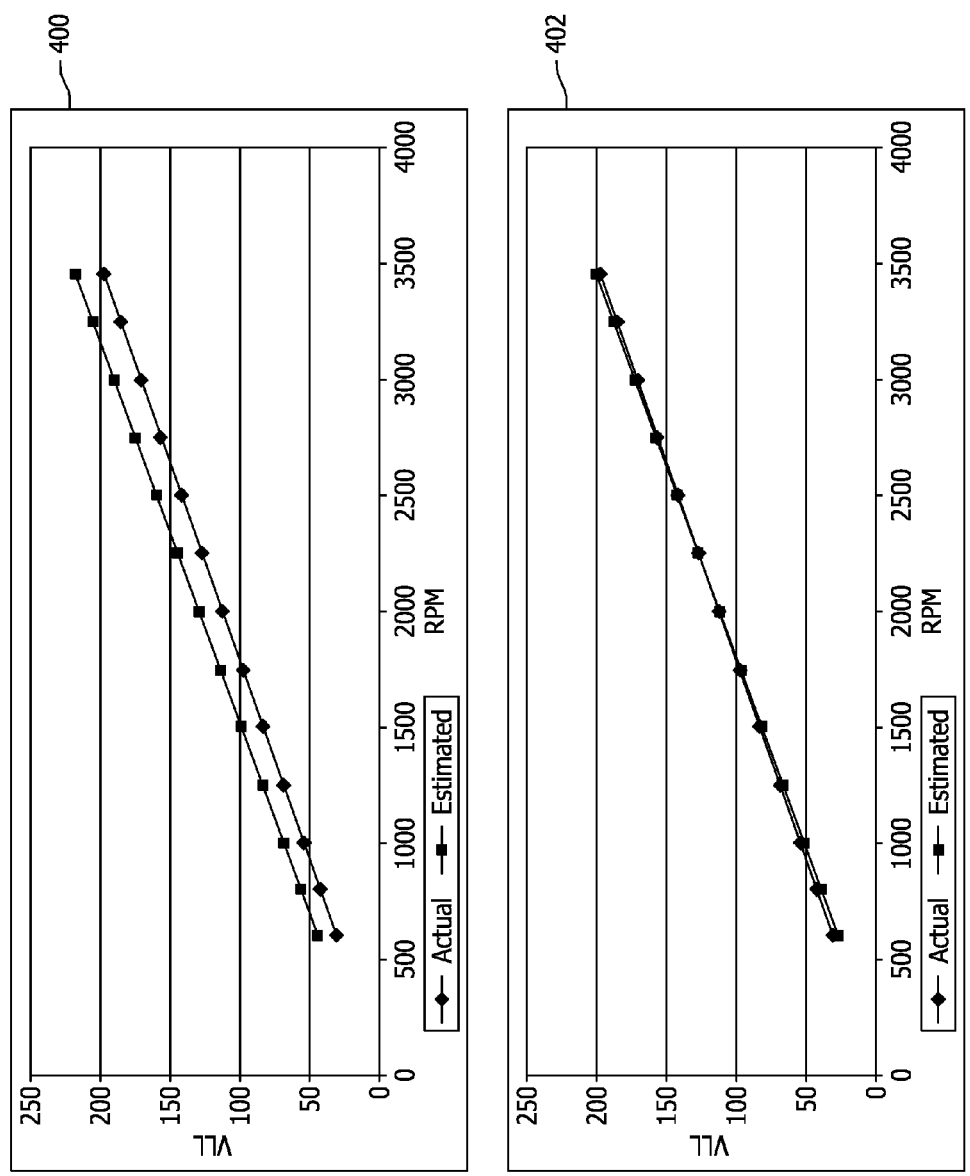
FIG. 4 illustrates a graphical relationship between actual and estimated motor voltages without compensation and with deadtime voltage compensation.

FIG. 4 is a graph 400 of actual and estimated motor voltages without compensation and a graph 402 of actual and estimated voltages after deadtime compensation algorithm 200 has been applied. It is apparent from graph 400 that without compensation, the difference in between the estimated and the measured voltage is almost constant. Graph 402 shows that with compensation, the estimated voltage is almost equal to the measured voltage.

Figure 5:
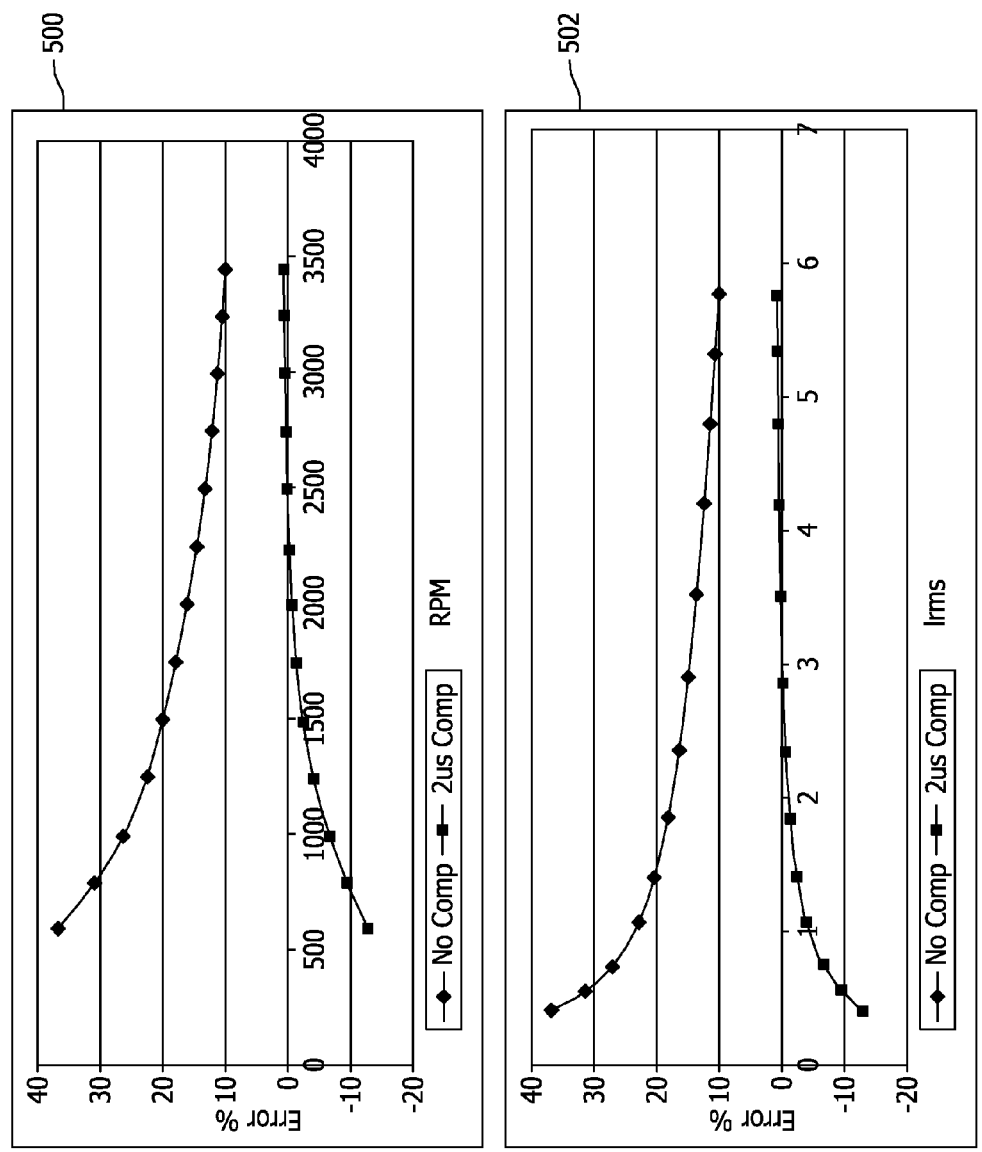
FIG. 5 illustrates graphical relationships between voltage error percentage without compensation and with deadtime voltage compensation relative to revolutions per minute (RPM) and current.

FIG. 5 is a graph 500 of voltage error percentage with and without deadtime compensation applied relative to revolutions per minute (RPM) and a graph 502 of voltage error percentage with and without deadtime compensation applied relative to current. As shown in graph 400, voltage error, the difference between estimated voltage and actual voltage, without deadtime compensation is fairly constant until the current becomes low. As a result, estimation error percentage increases as speed decreases as shown in graph 500. Compensation improves the voltage estimation overall and fairly good mid to high speed range. Compensation required in low speed region is less. Since the compensation vector magnitude stays constant, low speed region has high percentage of negative error.

Figure 6:
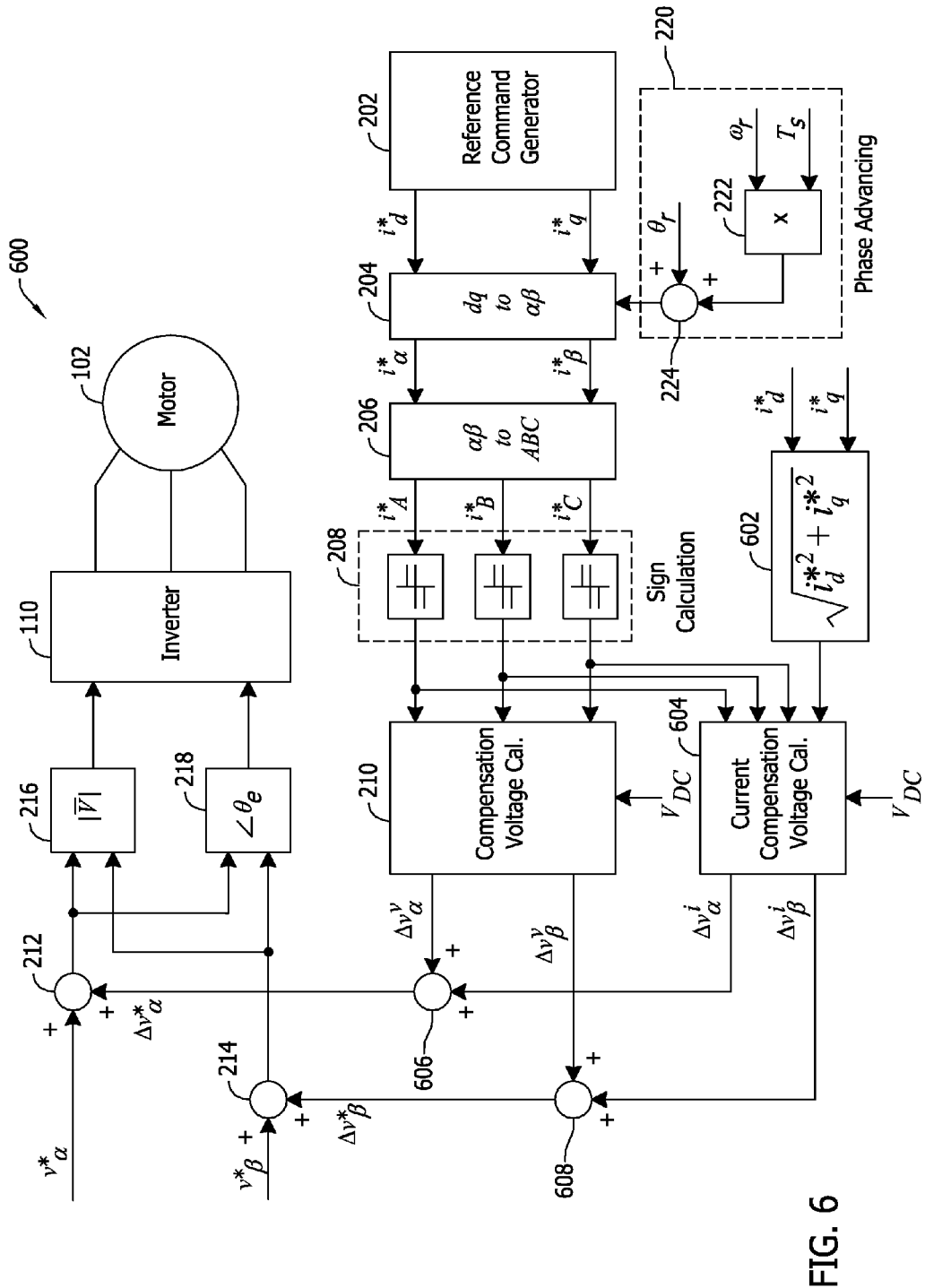
FIG. 6 is a block diagram of an exemplary control unit that may be used with the motor controller shown in FIG. 1.

FIG. 6 is an exemplary voltage and current compensation algorithm 600 that may be implemented by control unit 108. As the test results have shown, even with the application of deadtime voltage compensation algorithm 200, the percentage of voltage error increases as the current decreases. Voltage and current compensation algorithm 600 is provided to further reduce the estimation error. Voltage and current compensation algorithm 600 accounts for the non-linearity introduced by the low current magnitude on turn on/off time of power devices. Components of voltage and current compensation algorithm 600 that are identical to components of deadtime voltage compensation algorithm 200 are labeled with the same reference numbers used in FIG. 2 and their descriptions will not be repeated.

In the exemplary embodiment, voltage and current compensation algorithm 600 includes a magnitude calculation module 602 and a current compensation module 604. Magnitude calculation module 602 calculates the magnitude of reference currents $i_d^*$ and $i_q^*$ and inputs the result into current compensation module 604. Current compensation module 604 also receives the polarities for each phase current $i_A^*$, $i_B^*$, and $i_C^*$ from sign calculation module 208.

FIG. 7 is an exemplary voltage and current compensation calculation table 700 used by current compensation module 604 to determine a current compensation magnitude to add to the voltage compensation signal. In table 700, $\overline{\Delta V_t}$ is total deadtime voltage magnitude and $\Delta^i$ is the current compensation component. Current compensation module 604 generates current compensated voltage vector components $\Delta v_\alpha^i$ and $\Delta v_\beta^i$ and adds them to voltage vector components $\Delta v_\alpha^v$ and $\Delta v_\beta^v$ in summation blocks 606 and 608, respectively. Total compensation vector component $\Delta v_\alpha^*$ is added to commanded voltage $v_\alpha^*$ at first summation block 212 and $\Delta v_\beta^*$ is added to commanded voltage $v_\beta^*$ at second summation block 214. The resultant $\alpha$ and $\beta$ voltages are input into magnitude calculation module 216 and angle calculation module 218 for determining a magnitude and an angle of a final voltage command V* to be applied to inverter 110.

Figure 8:
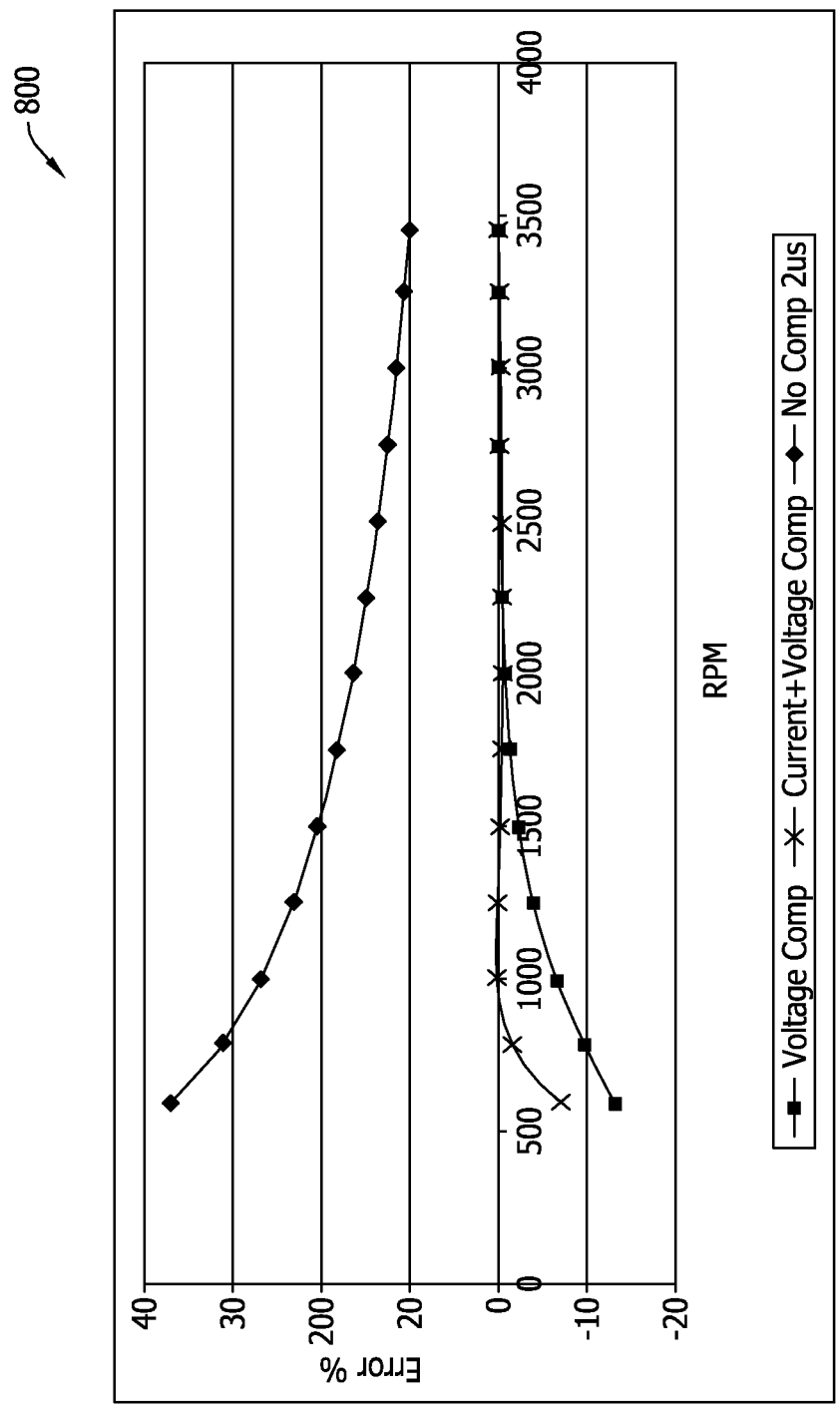
FIG. 8 illustrates a graphical relationship between voltage estimation error percentage using the voltage and current compensation algorithm implemented by the control unit shown in FIG. 6, using no compensation, and using the deadtime voltage compensation algorithm implemented by the control unit shown in FIG. 2.

FIG. 8 is a graph 800 voltage estimation error percentage using voltage and current compensation algorithm 600 as compared to using no compensation and deadtime voltage compensation algorithm 200. As shown in graph 800, there is an improvement in voltage estimation when using voltage and current compensation algorithm 600.

In the exemplary embodiment, control unit 108 is implemented in one or more processing devices, such as a microcontroller, a microprocessor, a programmable gate array, a reduced instruction set circuit (RISC), an application specific integrated circuit (ASIC), etc. Accordingly, in this exemplary embodiment, reference command generator 202, α-β conversion module 204, A-B-C conversion module 206, sign calculation module 208, compensation module 210, and current compensation module 704 are constructed of software and/or firmware embedded in one or more processing devices. In this manner, control unit 108 is programmable, such that instructions, intervals, thresholds, and/or ranges, etc. may be programmed for a particular electric motor 102 and/or operator of electric motor 102. One or more of reference command generator 202, α-β conversion module 204, A-B-C conversion module 206, sign calculation module 208, compensation module 210, and current compensation module 704 may be wholly or partially provided by discrete components, external to one or more processing devices.

The described embodiments provide deadtime voltage compensation to neutralize the effects of deadtime. The deadtime effect manifests itself by modifying the magnitude as well as the phase of the commanded voltage vector. The embodiments described herein reduce error in voltage estimation in low voltage and low speed regions of electric motor operation. Moreover, the embodiments described herein overall provide an improved current waveform and reduce distortion of current supplied to the electric motor.

A technical effect of the methods and systems described herein may include one or more of: (a) determining a polarity of each phase of a reference current command or actual current; and (b) generating a voltage compensation command signal using the determined polarities of the reference current command and a measurement of DC bus voltage, the voltage compensation signal compensating said drive controller to neutralize an effect of deadtime effect.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric motor drive controller configured to be coupled to an electric motor, said drive controller comprising:
   a rectifier configured to convert an AC input voltage to a DC voltage;
   a DC bus electrically coupled to the rectifier;
   an inverter electrically coupled to the DC bus and configured to generate an AC voltage to drive the electric motor; and
   a control unit comprising:
      a reference command generator configured to generate a two-phase reference current command in a direct-quadrature (d-q) reference frame;
      a conversion module configured to convert the two-phase reference current command into a three-phase reference current command;
      a sign calculation module configured to determine a polarity of each phase of the three phase reference current command based solely on the three-phase reference current command and generate a polarity set based on the determined polarities, the polarity set representing a deadtime voltage vector associated with a deadtime effect; and
      a compensation module configured to generate a voltage compensation command signal using the polarity set of the three-phase reference current command, and one of a measurement of DC bus voltage and a constant DC bus voltage value, the voltage compensation signal generated in a two-phase stationary reference frame, the voltage compensation signal including a compensation voltage vector that opposes the deadtime voltage vector for said drive controller and is applied to a reference voltage command signal in the two-phase stationary reference frame to neutralize a deadtime effect before generating a final voltage command signal to be applied to the inverter.

2. The electric motor drive controller of claim 1, wherein to generate the voltage compensation command signal, said compensation module is further configured to dynamically calculate the voltage compensation command signal based on said one of a measurement of DC bus voltage and a constant DC bus voltage value.

3. The electric motor drive controller of claim 1, wherein said control unit further comprises a summation block configured to add a reference voltage command signal and the voltage compensation command signal.

4. The electric motor drive controller of claim 1, wherein said control unit further comprises a phase advancing module that optimizes a time that the voltage compensation command signal is applied.

5. The electric motor drive controller of claim 1, wherein the voltage compensation command signal reduces error in motor voltage estimation.

6. The electric motor drive controller of claim 1, wherein said control unit further comprises a current compensation module configured to generate a current compensation signal using the determined polarities of the reference current command, said one of the measurement of DC bus voltage and the constant DC bus voltage, and one of a calculated reference current and a measured current.

7. The electric motor drive controller of claim 6, further comprising a summation block configured to add the current compensation signal to the voltage compensation command signal.

8. The electric motor drive controller of claim 6, wherein the current compensation signal reduces error in motor voltage estimation.

9. The electric motor drive controller of claim 1, wherein said inverter is a three-phase inverter and is configured to generate a three phase AC voltage to drive the electric motor.

10. A method of controlling an electric motor using a motor drive controller, said method comprising:
generating a two-phase reference current command in a direct-quadrature (d-q) reference frame;
converting the two-phase reference current command into a three-phase reference current command;
determining a polarity of each phase of the of a three-phase reference current command based solely on the three-phase reference current command to generate a polarity set based on the determined polarities, the polarity set representing a deadtime voltage vector associated with a deadtime effect; and
generating a voltage compensation command signal using the polarity set of the three-phase reference current command, and one of a measurement of DC bus voltage and a constant DC bus voltage, the voltage compensation signal generated in a two-phase stationary reference frame, the voltage compensation signal including a compensation voltage vector that opposes the deadtime voltage vector for the drive controller and is applied to a reference voltage command signal in the two-phase stationary reference frame to neutralize a deadtime effect before generating a final voltage command signal to be applied to the inverter.

11. The method of claim 10, wherein to generate the voltage compensation command signal, said method further comprises dynamically calculating the voltage compensation command signal based on the one of a measurement of DC bus voltage and a constant DC bus voltage value.

12. The method of claim 10, further comprising adding a reference voltage command signal and the voltage compensation command signal.

13. The method of claim 10, further comprising optimizing a time that the voltage compensation command signal is applied.

14. The method of claim 10, further comprising reducing error in motor voltage estimation in magnitude and phase by applying the voltage compensation command signal.

15. The method of claim 10, further comprising generating a current compensation signal using the one of the determined polarities of the reference current command and the measured currents, the one of the measurement of DC bus voltage and the constant DC bus voltage, and one of a calculated reference current magnitude and a measured current magnitude.

16. The method of claim 10, further comprising adding the current compensation signal to the voltage compensation command signal.

17. The method of claim 10, further comprising reducing error in motor voltage vector estimation in magnitude and phase by applying the voltage compensation command signal.

* * * * *